(12) United States Patent
Kasonde et al.

(10) Patent No.: US 11,498,873 B2
(45) Date of Patent: Nov. 15, 2022

(54) SUPERHARD CONSTRUCTIONS AND METHODS OF MAKING SAME

(71) Applicant: ELEMENT SIX ABRASIVES S.A.

(72) Inventors: Maweja Kasonde, Oxfordshire (GB); Valentine Kanyanta, Oxfordshire (GB); Teresa Rodriguez Suarez, Oxfordshire (GB)

(73) Assignee: ELEMENT SIX ABRASIVES HOLDINGS LIMITED, London (GB)

( * ) Notice: Subject to any disclaimer, the term of this patent is extended or adjusted under 35 U.S.C. 154(b) by 461 days.

(21) Appl. No.: 16/407,902

(22) Filed: May 9, 2019

(65) Prior Publication Data

US 2019/0263723 A1 Aug. 29, 2019

Related U.S. Application Data

(63) Continuation of application No. 15/107,778, filed as application No. PCT/EP2014/079474 on Dec. 30, 2014, now abandoned.

(30) Foreign Application Priority Data

Dec. 31, 2013 (GB) ..................................... 1323169

(51) Int. Cl.
*B24D 3/02* (2006.01)
*B24D 18/00* (2006.01)
(Continued)

(52) U.S. Cl.
CPC ................ *C04B 35/52* (2013.01); *B22F 3/14* (2013.01); *B22F 7/06* (2013.01); *B24D 18/0009* (2013.01);
(Continued)

(58) Field of Classification Search
USPC .......................................... 51/293, 307, 309
See application file for complete search history.

(56) References Cited

U.S. PATENT DOCUMENTS 6,189,634 B1   2/2001  Bertagnolli et al.
8,202,335 B2 * 6/2012  Cooley .................. B24D 18/00
                                                    51/307
(Continued)

FOREIGN PATENT DOCUMENTS

WO   2009128034   10/2009
WO   2011098559    8/2011

*Primary Examiner* — James E McDonough
(74) *Attorney, Agent, or Firm* — Bryan Cave Leighton Paisner LLP

(57) ABSTRACT

A polycrystalline super hard construction comprises a body of polycrystalline super hard material and a substrate bonded to the body along an interface. The substrate a first end surface forming the interface, the first end surface comprising a projection extending from the body of the substrate into the body of super hard material towards the cutting face, the body of polycrystalline material extending around the projection. The body of polycrystalline material comprises a first region more thermally stable than a second region, the first region comprising an annular portion located around the projection, the second region extending between and bonding the first region to the substrate. The first region has a thickness from the cutting face along the peripheral side edge to the interface of at least around 3 mm and a portion of the projection has a thickness measured in a plane extending along the longitudinal axis of at least around 3 mm.

9 Claims, 5 Drawing Sheets

(51) Int. Cl.

| | | |
|---|---|---|
| *C04B 35/52* | (2006.01) | |
| *E21B 10/573* | (2006.01) | |
| *B22F 7/06* | (2006.01) | |
| *C22C 26/00* | (2006.01) | |
| *B24D 99/00* | (2010.01) | |
| *B22F 3/14* | (2006.01) | |
| *C04B 35/528* | (2006.01) | |
| *C04B 35/63* | (2006.01) | |
| *C04B 37/02* | (2006.01) | |
| *C04B 35/632* | (2006.01) | |
| *C04B 35/638* | (2006.01) | |
| *C04B 35/645* | (2006.01) | |
| *E21B 10/567* | (2006.01) | |
| *B24D 3/00* | (2006.01) | |
| *B24D 11/00* | (2006.01) | |
| *C09K 3/14* | (2006.01) | |
| *C22C 29/08* | (2006.01) | |
| *B22F 5/00* | (2006.01) | |

(52) U.S. Cl.
CPC .......... *B24D 99/005* (2013.01); *C04B 35/528* (2013.01); *C04B 35/632* (2013.01); *C04B 35/6303* (2013.01); *C04B 35/638* (2013.01); *C04B 35/645* (2013.01); *C04B 37/021* (2013.01); *C04B 37/025* (2013.01); *C22C 26/00* (2013.01); *E21B 10/567* (2013.01); *E21B 10/5735* (2013.01); *B22F 2005/001* (2013.01); *B22F 2998/10* (2013.01); *B22F 2999/00* (2013.01); *C04B 2235/386* (2013.01); *C04B 2235/405* (2013.01); *C04B 2235/427* (2013.01); *C04B 2235/602* (2013.01); *C04B 2235/604* (2013.01); *C04B 2235/661* (2013.01); *C04B 2235/75* (2013.01); *C04B 2237/343* (2013.01); *C04B 2237/348* (2013.01); *C04B 2237/361* (2013.01); *C04B 2237/363* (2013.01); *C04B 2237/401* (2013.01); *C04B 2237/64* (2013.01); *C22C 29/08* (2013.01); *C22C 2204/00* (2013.01)

(56) References Cited

U.S. PATENT DOCUMENTS

| | | |
|---|---|---|
| 2004/0009376 A1 | 1/2004 | Wan et al. |
| 2008/0142276 A1* | 6/2008 | Griffo ................ E21B 10/5735 |
| | | 175/434 |
| 2010/0236837 A1* | 9/2010 | Achilles ............... B23B 27/148 |
| | | 175/428 |
| 2011/0023375 A1 | 2/2011 | Sani et al. |
| 2011/0120782 A1 | 5/2011 | Cooley et al. |
| 2011/0139514 A1 | 6/2011 | Voronin et al. |
| 2011/0259648 A1 | 10/2011 | Sani |
| 2012/0012401 A1 | 1/2012 | Gonzalez et al. |
| 2012/0103697 A1 | 5/2012 | DiGiovanni et al. |
| 2012/0225253 A1 | 9/2012 | DiGiovanni et al. |
| 2012/0304547 A1* | 12/2012 | Anagnostaras ...... B24D 99/005 |
| | | 51/309 |
| 2013/0000993 A1 | 1/2013 | Shabalala et al. |
| 2013/0047397 A1 | 2/2013 | Jonker et al. |
| 2016/0144483 A1* | 5/2016 | Kasonde ............... E21B 10/567 |
| | | 51/309 |

* cited by examiner

SUPERHARD CONSTRUCTIONS AND METHODS OF MAKING SAME

FIELD

This disclosure relates to superhard constructions and methods of making such constructions, particularly but not exclusively to constructions comprising polycrystalline diamond (PCD) structures attached to a substrate, and tools comprising the same, particularly but not exclusively for use in rock degradation or drilling, or for boring into the earth.

BACKGROUND

Polycrystalline superhard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials. In particular, tool inserts in the form of cutting elements comprising PCD material are widely used in drill bits for boring into the earth to extract oil or gas. The working life of super hard tool inserts may be limited by fracture of the super hard material, including by spalling and chipping, or by wear of the tool insert.

Cutting elements such as those for use in rock drill bits or other cutting tools typically have a body in the form of a substrate which has an interface end/surface and a super hard material which forms a cutting layer bonded to the interface surface of the substrate by, for example, a sintering process. The substrate is generally formed of a tungsten carbide-cobalt alloy, sometimes referred to as cemented tungsten carbide and the super hard material layer is typically polycrystalline diamond (PCD), polycrystalline cubic boron nitride (PCBN) or a thermally stable product TSP material such as thermally stable polycrystalline diamond, the superhard layer bonded to the substrate in a PCD cutter element typically having a maximum thickness from the interface with the substrate to the working surface of around 2 mm.

Polycrystalline diamond (PCD) is an example of a superhard material (also called a superabrasive material or ultra hard material) comprising a mass of substantially inter-grown diamond grains, forming a skeletal mass defining interstices between the diamond grains. PCD material typically comprises at least about 80 volume % of diamond and is conventionally made by subjecting an aggregated mass of diamond grains to an ultra-high pressure of greater than about 5 GPa, and temperature of at least about 1,200° C., for example. A material wholly or partly filling the interstices may be referred to as filler or binder material.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Most typically, PCD is often formed on a cobalt-cemented tungsten carbide substrate, which provides a source of cobalt solvent-catalyst for the PCD. Materials that do not promote substantial coherent intergrowth between the diamond grains may themselves form strong bonds with diamond grains, but are not suitable solvent-catalysts for PCD sintering.

Cemented tungsten carbide which may be used to form a suitable substrate is formed from carbide particles being dispersed in a cobalt matrix by mixing tungsten carbide particles/grains and cobalt together then heating to solidify. To form the cutting element with a superhard material layer such as PCD or PCBN, diamond particles or grains or CBN grains are placed adjacent the cemented tungsten carbide body in a refractory metal enclosure such as a niobium enclosure and are subjected to high pressure and high temperature so that inter-grain bonding between the diamond grains or CBN grains occurs, forming a polycrystalline superhard diamond or polycrystalline CBN layer.

In some instances, the substrate may be fully cured prior to attachment to the superhard material layer whereas in other cases, the substrate may be green, that is, not fully cured. In the latter case, the substrate may fully cure during the HTHP sintering process. The substrate may be in powder form and may solidify during the sintering process used to sinter the superhard material layer.

Ever increasing drives for improved productivity in the earth boring field place ever increasing demands on the materials used for cutting rock. Specifically, PCD materials with improved abrasion and impact resistance are required to achieve faster cut rates and longer tool life.

Cutting elements or tool inserts comprising PCD material are widely used in drill bits for boring into the earth in the oil and gas drilling industry. Rock drilling and other operations require high abrasion resistance and impact resistance. One of the factors limiting the success of the polycrystalline diamond (PCD) abrasive cutters is the generation of heat due to friction between the PCD and the work material. This heat causes the thermal degradation of the diamond layer. The thermal degradation increases the wear rate of the cutter through increased cracking and spalling of the PCD layer as well as back conversion of the diamond to graphite causing increased abrasive wear.

Methods used to improve the abrasion resistance of a PCD composite often result in a decrease in impact resistance of the composite.

The most wear resistant grades of PCD and PCBN used in cutters usually fail by spalling resulting in a catastrophic fracture of the cutter before it has worn out. Spalling is considered to be caused by a crack propagating from working area to the top free surface of the cutting tool. During the use of these cutters, cracks grow until they reach a critical length at which catastrophic failure occurs, namely, when a large portion of the PCD or PCBN breaks away in a brittle manner. Catastrophic failure of a component or structure indicates that a crack grew to reach the "critical crack length" of the given structural material. The "critical crack length" is the acceptable length of crack beyond which the propagation of the crack becomes uncontrollable leading to catastrophic failure independently of the remaining non-working area of the component. The long, fast growing cracks encountered during use of conventionally sintered PCD and PCBN can therefore result in shorter tool life.

Furthermore, despite their high strength, polycrystalline diamond (PCD) and PCBN materials are usually susceptible to impact fracture due to their low fracture toughness. Improving fracture toughness without adversely affecting the material's high strength and abrasion resistance is a challenging task.

There is therefore a need for a superhard composite that has good or improved abrasion, fracture and impact resistance and a method of forming such composites.

SUMMARY

Viewed from a first aspect there is provided a polycrystalline superhard construction comprising:
a body of polycrystalline superhard material having a cutting face and a cutting edge; and
a substrate bonded to the body of polycrystalline superhard material along an interface;
the construction having a central longitudinal axis extending therethrough and a peripheral side edge; wherein:
the substrate comprises a substrate body and a first end surface forming the interface, the first end surface of the substrate comprising a projection extending from the body of the substrate into the body of superhard material towards the cutting face, the body of polycrystalline material extending around the projection;
wherein the body of polycrystalline material comprises a first region and a second region, the first region being more thermally stable than the second region, the first region comprising an annular portion located around the projection extending from the body of the substrate, the cutting edge being in the first region, the second region extending between and bonding the first region to the substrate at one or more locations; and
wherein the first region body of polycrystalline material has a thickness from the cutting face along the peripheral side edge to the interface with the substrate of at least around 3 mm; and
wherein at least a portion of the projection has a thickness measured in a plane extending along the longitudinal axis of the construction of at least around 3 mm.

Viewed from a second aspect there is provided a method of forming a superhard polycrystalline construction, comprising:
providing a first mass of particles or grains of superhard material;
admixing the first mass of particles or grains with a binder material to form a first green body;
placing the first green body into a canister to form a first pre-sinter assembly;
treating the first pre-sinter assembly in the presence of a catalyst/solvent material for the superhard grains at an ultra-high pressure of around 5.5 GPa or greater and a temperature to sinter together the grains of superhard material to form a first polycrystalline superhard construction;
processing the first polycrystalline superhard construction to form a first thermally stable annular region;
preparing a second pre-sinter assembly comprising placing a second mass of particles or grains of superhard material to form a second polycrystalline superhard region in contact with a pre-formed substrate and the first thermally stable annular region, the pre-formed substrate having a longitudinal axis and comprising a body portion and a projection, the projection extending at least in part from the body portion by around 3 mm or greater as measured in a plane parallel to the longitudinal axis of the substrate;
treating the second pre-sinter assembly in the presence of a catalyst/solvent material for the superhard grains at an ultra-high pressure of around 5.5 GPa or greater and a temperature to sinter together the second mass of grains of superhard material to form the second region and bond the substrate to the first and second regions of polycrystalline superhard material; wherein the projection extends from the body of the substrate into the body of superhard material towards a cutting face, the body of polycrystalline material extending around the projection; and wherein the body of polycrystalline material has a thickness from the cutting face along a peripheral side edge of the construction to the interface with the substrate of at least around 3 mm, the cutting face being in the first region.

Viewed from a further aspect there is provided a tool comprising the superhard polycrystalline construction defined above, the tool being for cutting, milling, grinding, drilling, earth boring, rock drilling or other abrasive applications.

The tool may comprise, for example, a drill bit for earth boring or rock drilling, a rotary fixed-cutter bit for use in the oil and gas drilling industry, or a rolling cone drill bit, a hole opening tool, an expandable tool, a reamer or other earth boring tools.

Viewed from another aspect there is provided a drill bit or a cutter or a component therefor comprising the superhard polycrystalline construction defined above.

BRIEF DESCRIPTION OF THE DRAWINGS

Examples will now be described by way of example and with reference to the accompanying drawings in which.

The same references refer to the same general features in all the drawings.

DESCRIPTION

As used herein, a "superhard material" is a material having a Vickers hardness of at least about 28 GPa. Diamond and cubic boron nitride (cBN) material are examples of superhard materials.

As used herein, a "superhard construction" means a construction comprising a body of polycrystalline superhard material. In such a construction, a substrate may be attached thereto.

As used herein, polycrystalline diamond (PCD) is a type of polycrystalline superhard (PCS) material comprising a mass of diamond grains, a substantial portion of which are directly inter-bonded with each other and in which the content of diamond is at least about 80 volume percent of the material. In one example of PCD material, interstices between the diamond grains may be at least partly filled with a binder material comprising a catalyst for diamond. As used herein, "interstices" or "interstitial regions" are regions between the diamond grains of PCD material. In examples of PCD material, interstices or interstitial regions may be substantially or partially filled with a material other than diamond, or they may be substantially empty. PCD material may comprise at least a region from which catalyst material has been removed from the interstices, leaving interstitial voids between the diamond grains.

A "catalyst material" for a superhard material is capable of promoting the growth or sintering of the superhard material.

The term "substrate" as used herein means any substrate over which the superhard material layer is formed. For example, a "substrate" as used herein may be a transition layer formed over another substrate.

As used herein, the term "integrally formed" means regions or parts are produced contiguous with each other and are not separated by a different kind of material.

Components comprising PCBN are used principally for machining metals. PCBN material comprises a sintered mass of cubic boron nitride (cBN) grains. The cBN content of PCBN materials may be at least about 40 volume %. When the cBN content in the PCBN is at least about 70 volume % there may be substantial direct contact among the cBN grains. When the cBN content is in the range from about 40 volume % to about 60 volume % of the compact, then the extent of direct contact among the cBN grains is limited. PCBN may be made by subjecting a mass of cBN particles together with a powdered matrix phase, to a temperature and pressure at which the cBN is thermodynamically more stable than the hexagonal form of boron nitride, hBN. PCBN is less wear resistant than PCD which may make it suitable for different applications to that of PCD.

Figure 1:
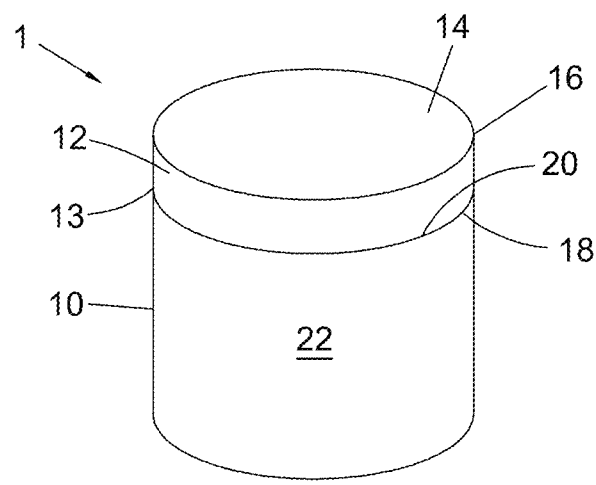
FIG. 1 is a perspective view of an example superhard cutter element for a drill bit for boring into the earth.

In a PCD construction as shown in FIG. 1, a cutting element 1 includes a substrate 10 with a layer of superhard material 12 formed on the substrate 10. The substrate 10 may be formed of a hard material such as cemented tungsten carbide. The superhard material 12 may be, for example, polycrystalline diamond (PCD), a thermally stable product such as thermally stable PCD (TSP), or polycrystalline cubic boron nitride (PCBN). The cutting element 1 may be mounted into a bit body such as a drag bit body (not shown) and may be suitable, for example, for use as a cutter insert for a drill bit for boring into the earth.

The exposed surface of the superhard material opposite the face which forms the interface with the substrate, forms the cutting face 14 of the cutter element, that is, the surface which, along with its edge 16, performs the cutting in use.

At one end of the substrate 10 is an interface surface 18 that forms an interface with the superhard material layer 12 which is attached thereto at this interface surface. As shown in the example of FIG. 1, the substrate 10 is generally cylindrical and has a peripheral top edge 20 and a peripheral surface 22.

As used herein, a PCD or PCBN grade is a PCD or PCBN material characterised in terms of the volume content and size of diamond grains in the case of PCD or cBN grains in the case of PCBN, the volume content of interstitial regions between the grains, and composition of material that may be present within the interstitial regions. A grade of superhard material may be made by a process including providing an aggregate mass of superhard grains having a size distribution suitable for the grade, optionally introducing catalyst material or additive material into the aggregate mass, and subjecting the aggregated mass in the presence of a source of catalyst material for the superhard material to a pressure and temperature at which the superhard grains are more thermodynamically stable than graphite (in the case of diamond) or hBN (in the case of CBN), and at which the catalyst material is molten. Under these conditions, molten catalyst material may infiltrate from the source into the aggregated mass and is likely to promote direct intergrowth between the diamond grains in a process of sintering, to form a polycrystalline superhard structure. The aggregate mass may comprise loose superhard grains or superhard grains held together by a binder material. In the context of diamond, the diamond grains may be natural or synthesised diamond grains.

Different grades of superhard material such as polycrystalline diamond may have different microstructures and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

In the context of PCD, the PCD grades may comprise interstitial regions filled with material comprising cobalt metal, which is an example of catalyst material for diamond.

The polycrystalline superhard structure 12 shown in the cutter element of FIG. 1 may comprise, for example, one or more PCD grades.

FIGS. 2a to 2k are schematic cross-sections through eleven examples of example polycrystalline superhard cutter elements 1. The eleven examples all comprise a substrate 10 extending to a distance t from the cutting face 14 of the polycrystalline superhard structure 12, the polycrystalline superhard structure 12 having a thickness h as measured from the cutting face 14 of the polycrystalline superhard structure 12 along the barrel 13 thereof to the interface with the substrate 10, the barrel 13 being the peripheral side edge of the cutter element 1. In these examples shown in FIGS. 2a to 2k, the thickness h is preferably greater than or equal to around 4 mm. Furthermore, in these examples, the thickness t is preferably less than or equal to around 0.5 mm.

In some examples, and in particular those where a planar central section 26 of the substrate extends to and forms part of the cutting face 14, the cutting face 14 or a portion thereof may be protected against erosion, corrosion or chemical degradation by attaching or spraying for example a layer of resistant polymer, oxide, paint, composite materials, onto the surface. The protective layer(s) may be formed during pre-composite assembly and bonded on to the cutter surface during HPHT sintering. Alternatively, the protective layer(s) may be attached to the cutter surface after sintering and processing and adhered thereto by surface interaction.

The eleven examples of FIGS. 2a to 2k differ in the shape of the end face of the substrate portion 10 which forms the interface 18 with the polycrystalline superhard structure 12 and/or the structural composition of the polycrystalline superhard structure 12.

In the examples of FIGS. 2a to 2k, the polycrystalline superhard structure 12 comprises a first region 40 and a second region 42. The first region 40 comprises, for example, polycrystalline diamond from which at least a portion of the residual catalyst has been removed from interstitial spaces between the inter-bonded diamond grains. The first region 40 is generally annular in shape in that it extends around a protruding central section 27 of the substrate 10. The first region 40 is spaced from the substrate 10 at one or more locations by the second region 42. The second region 42 differs from the first region 40 in one or more characteristics such as diamond grain size, hardness, impact resistance, and composition and may act as a buffer for the first region 40 either in use or in formation of the superhard cutter element 1 to manage residual stresses in the element 1. The second region 42 also assists in attachment of the first region 40 which is pre-formed and rendered thermally stable prior to construction of the superhard cutter element 1, to bond the first region 40 to the substrate 10. The second region 42 may also act as a barrier to infiltration of catalyst-solvent or other elements from the substrate during construction of the super hard cutter element 1.

In the examples shown in FIGS. 2a to 2k, the polycrystalline super hard layer 12 may extend over the substrate portion at the cutting face 14 up to the second region 42 and this may be advantageous as the substrate 10 is thereby protected from chemical erosion and abrasion during application and also from chemical attack in the event that the cutter element 1 is subjected to a treatment such as acid leaching after sintering.

Figure 2A:
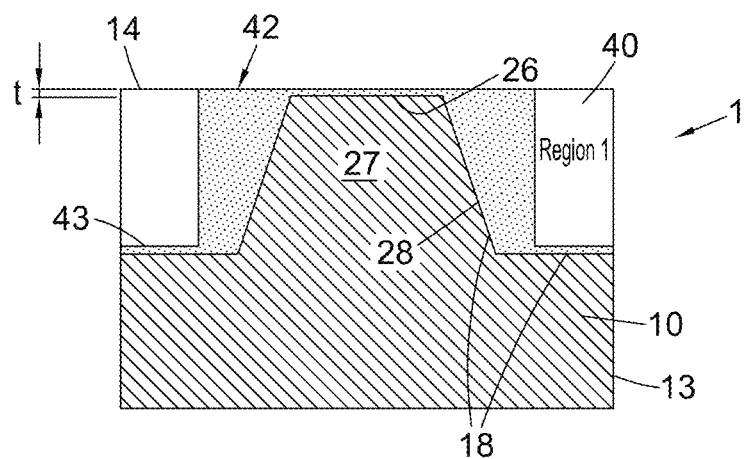
FIGS. 2a to 2k are schematic cross-sections of example superhard cutter elements with differing interfaces with and/or structural compositions of the superhard body and substrate attached thereto.

In the example shown in FIG. 2a, the end face of the substrate portion 10 which forms the interface 18 has a planar, coaxially located central section 26 which, at the end face is circular in cross section having a diameter d. This planar section 26 forms the furthest point of the interface 18 from the body of the substrate and is spaced from the cutting face 14 by a distance t along the longitudinal axis of the cutter element 1. The substrate 10 thereby comprises a truncated cone at the interface end projecting from the body of the substrate and extending through the layer of superhard material towards the cutting face 14. The diameter d of the planar central section 26 of the substrate which forms part of the interface 18 with the superhard layer is less than the diameter D of the cutter element 1. The surface 28 of the substrate extends from the peripheral edge of the planar central section 26 towards the peripheral side edge or barrel 13 of the cutter element 1 at an angle of, for example, up to around 30 degrees to the plane parallel to the plane through which the longitudinal axis of the cutter element 1 extends. In some examples this angle may be up to around 5 degrees.

In the example shown in FIG. 2a, the surface 28 does not extend to the barrel 13 of the cutter element 1 but is spaced therefrom by a substantially planar portion 43. The first region 40 comprises a substantially cylindrical ring around the second region 42 which separates the first region from the substrate 10 and also extends over the planar central section 26.

In some examples, the length of the planar portion 43 may be, for example, between about 0 to about 3 mm, and in some examples around 2 mm or less.

Figure 2B:
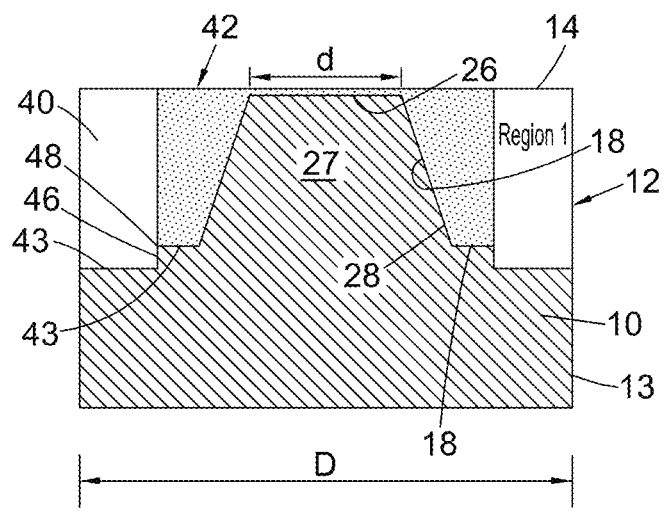

The example shown in FIG. 2b differs from that shown in FIG. 2a in that the planar portion 43 is replaced with a stepped portion 46 such that the surface 28 of the substrate extending from the peripheral edge of the planar central section 26 towards the peripheral side edge 13 of the cutter element 1 extends to a first planar portion 47, the first region 40 extending from the peripheral edge 13 of the cutter element to the free edge 48 of the first planar portion.

Figure 2C:
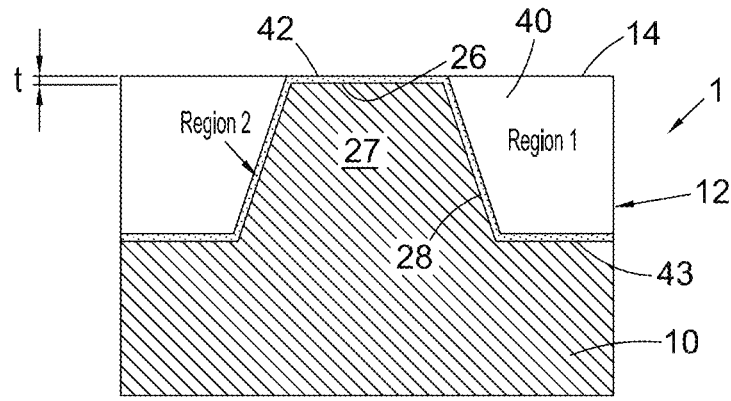

The example in FIG. 2c differs from that of FIG. 2a in that the second region 42 follows the contours of the substrate 10 at the interface 18 such that it forms a barrier between the substrate 10 and the first region 40 across the interface 18 with the second region extending over the planar portion 43, along the surface 28 and over the planar central section 26. The inner periphery of the annular first region 40 is correspondingly shaped to contact the second region along its surface.

Figure 2D:
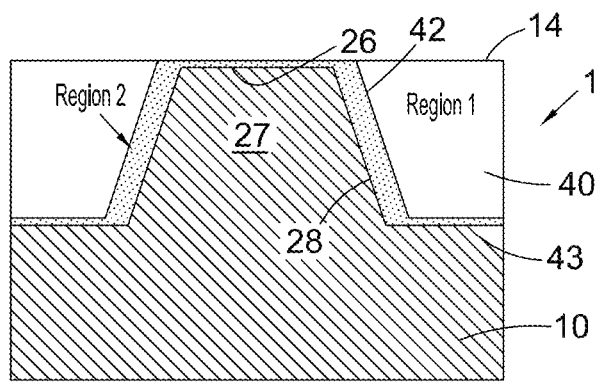

The example in FIG. 2d differs from that of FIG. 2c in that the depth of the second region 42 that extends along the surface 28 is greater than that in FIG. 2c.

Figure 2E:
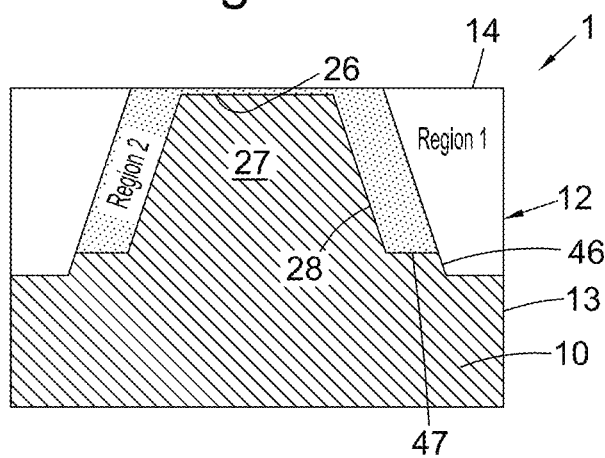

The example in FIG. 2e differs from that of FIG. 2b in the inner peripheral shape of the first region 40 which contacts the second region 42. In the example of FIG. 2b, the inner peripheral shape of the first region 40 being such that the first region was generally cylindrical with a central aperture therein encasing the first region about the protruding central section 27 of the substrate 10, whereas in the example of FIG. 2e, the second region 42 is substantially frustro-conical in shape with a central aperture therein the peripheral walls of which contact and extend around the surface 28 of the protruding central section 27 of the substrate 10. The inner peripheral shape of the first region 40 follows the contours of the frustro-conical shape of the second region 42 around the protruding central section 27 of the substrate 10.

Figure 2F:
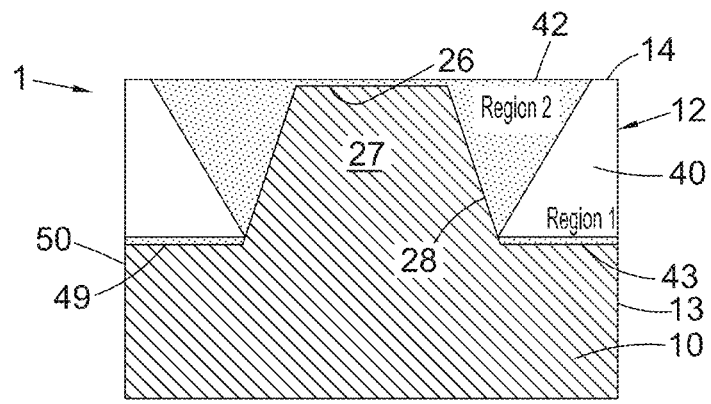

In the example of FIG. 2f, the second region 42 is substantially frustro-conical in shape with the diameter of the second region forming part of the cutting face 14 being greater than the diameter at the point of intersection with the surface 28 of the protruding central section 27 of the substrate 10 which extends through the second region 42. A further region 49 which may be of the same elemental composition as that of the second region 42 extends from the point of intersection of the second region 42 with the surface 28 and forms a substantially planar region 50 extending to the barrel 13.

Figure 2G:
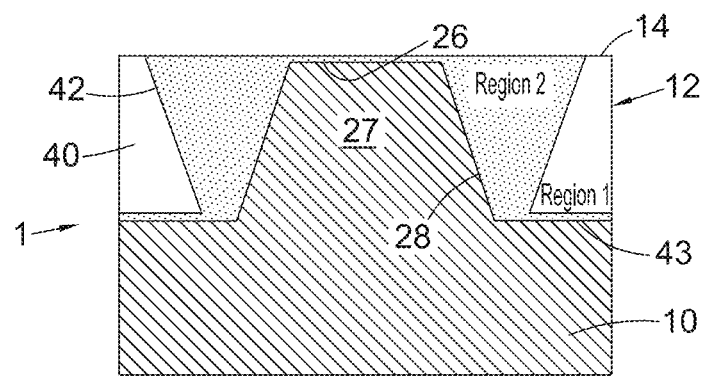

The example in FIG. 2g differs from that of FIG. 2f in that the second region 42 has a truncated peak that extends over a part of the substantially planar region 50.

Figure 2H:
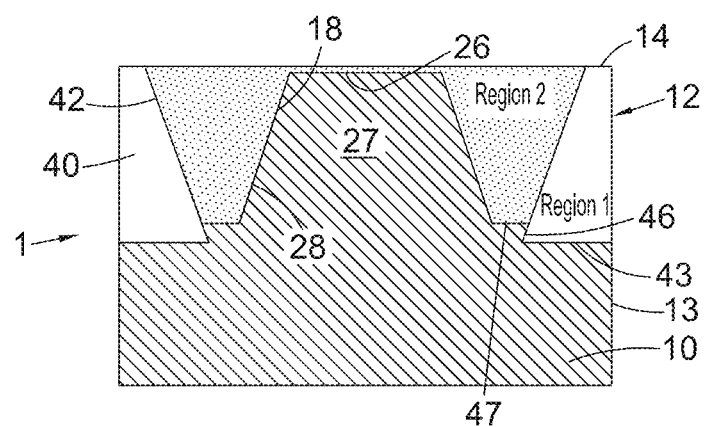

The example in FIG. 2h differs from that of FIG. 2b in that the second region 42 is substantially frustro-conical in shape having a truncated peak and with the diameter of the second region forming part of the cutting face 14 being greater than the diameter at the point of intersection with the stepped portion 46. In this example, the surface 28 of the substrate extends from the peripheral edge of the planar central section 26 towards the peripheral side edge 13 of the cutter element 1 to a first planar portion 47, the first region 40 extending from the peripheral edge 13 of the cutter element to the free edge 48 of the first planar portion.

Figure 2I:
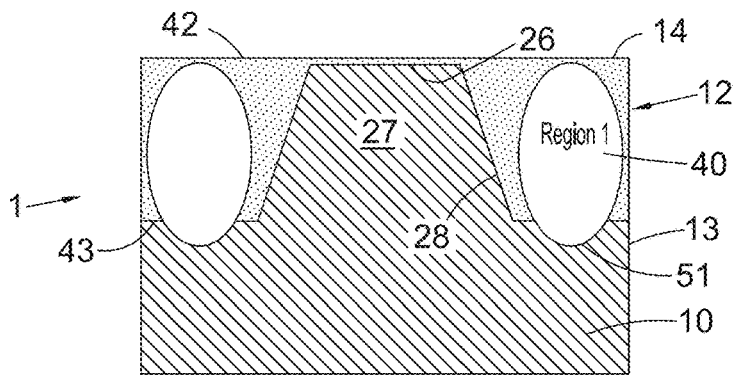

In the example in FIG. 2i, the first region 40 is substantially toroidal in shape extending around the protruding central section 27 of the substrate 10. The first region 40 is located in part in a recess 51 in the planar portion 43 of the substrate. The second region 42 extends to fill the space around the first region 40 and protruding central section 27 of the substrate 10 to form the substantially cylindrical outer shape of the polycrystalline superhard structure 12.

Figure 2J:
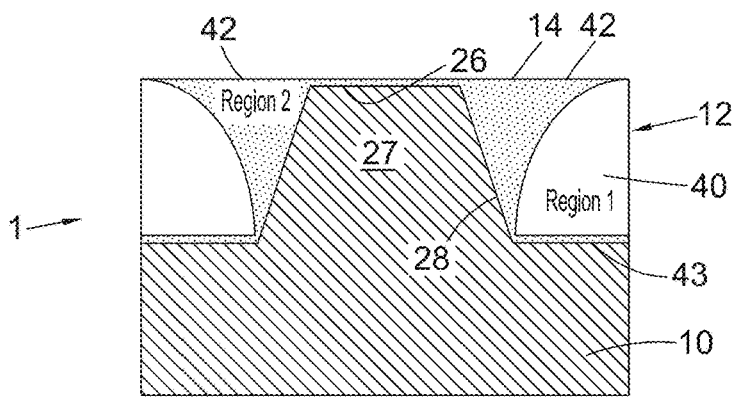
Figure 2K:
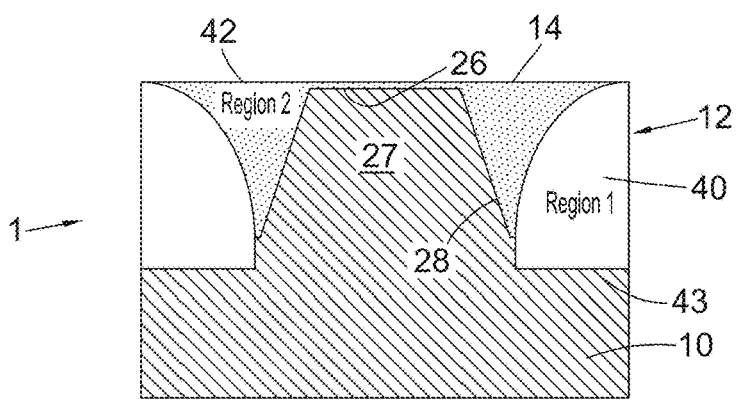

In the examples of FIGS. 2j and 2k, rather than being substantially conical as in the examples of FIGS. 2a and 2b, the inner peripheral surface of the first region 40 is convexly curved from the cutting face 14 towards the planar portion 43 of the first region. The second region 42 fills the region between first region and the protruding central section 27 of the substrate 10 to form the substantially cylindrical outer shape of the polycrystalline superhard structure 12.

The example of FIG. 2k differs from that in FIG. 2j in that the first region is in direct contact with the substrate 10 along the planar surface 43 from the barrel 13 to the base of a stepped portion 46. The second region 42 extends and fills the region from the cutting face 14 to the stepped portion 46 and the surface 28 of the protruding central section 27 of the substrate 10.

As mentioned above, in some examples, the second region 42 may differ from the first region 40 in for example, that it may be comprised of, for example, a different grade of superhard material to that of the first region 40, and/or, it may be a different composition to the first region 40.

Multiple additional regions of different grain size and/or composition may be included in some examples. The first and second and/or any subsequent regions may comprise a mixture of WC and diamond powders, a mixture of cBN and diamond powders, a mixture of refractory metals and superhard (such as W, V, Mo) material powders, or any combination thereof. Whilst not wishing to be bound by a particular theory, it is believed that the second region 42, and any further regions such as the further region 48, adjacent to the substrate 10 may eliminate the sudden change in CTE between the substrate and the superhard layer and thereby assist in inhibiting cracking and/or delamination of the sintered superhard layer from the substrate by minimising residual stress between layers of different compositions.

By forming the first region of thermally stable PCD, it may be possible to control the leaching profile to suit the end application of the cutter element 1.

Figure 3A:
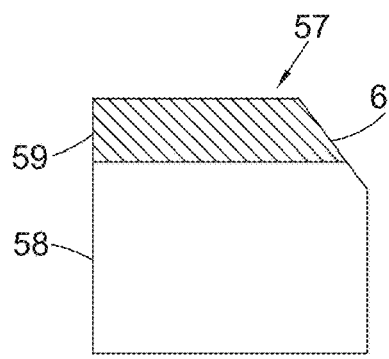
FIG. 3a is a schematic cross-section through a conventional superhard cutter element showing wear into the substrate through use.

FIG. 3a is a schematic cross-section through a conventional PCD cutter 57 formed of a substrate 58 attached to a layer of PCD material 59 showing wear into the substrate 58 through use. It will be seen that the wear flat 60 has progressed through both the PCD layer 59 and the substrate 57.

Figure 3B:
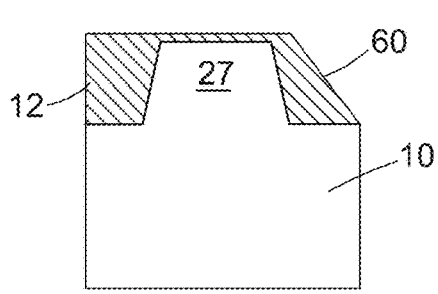
FIG. 3b is a schematic cross-section through an example superhard cutter element showing wear remaining in the superhard body after use.

FIG. 3b is a schematic cross-section through an example PCD cutter element showing wear remaining in the PCD body after use. The cutter shown in FIG. 3a is that of FIG. 2c and it will be seen that the wear flat 60 is retained in the layer of superhard material 12 and does not extend into the substrate 10 attached thereto.

Thus examples may enable the wear scar surface of the cutter to be maintained in the layer of superhard material which is advantageous as the wear scar surface may thereby be composed of homogeneous material and hence provide uniform friction across the wear scar surface. Having heterogeneous material across the wear scar surface as in the conventional cutter shown in FIG. 3a will result in the wear scar surface being formed of materials having different coefficients of friction which may contribute to crack initiation near the wear scar leading to reduced performance of the cutter and increased susceptibility of the cutter to failure through spalling.

Figure 4:
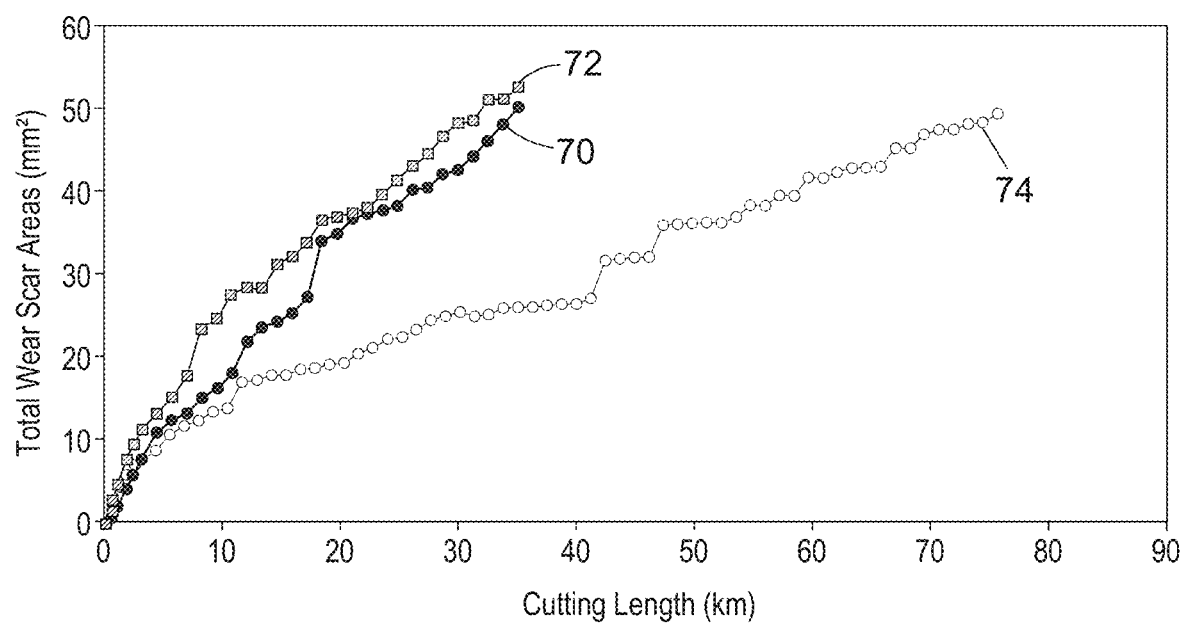
FIG. 4 is a plot showing the results of a vertical borer test comparing two conventional leached PCD cutter elements, and an example PCD cutter element.

FIG. 4 is a plot showing the results of a vertical borer test comparing two conventional leached PCD cutter elements, and an example PCD cutter element.

The grains of superhard material forming the first region 40 and/or the second region 42 may be, for example, diamond grains or particles, or for example, cBN grains or particles. In the starting mixture prior to sintering they may be, for example, bimodal, that is, the feed comprises a mixture of a coarse fraction of superhard grains and a fine fraction of superhard grains. In some examples, the coarse fraction may have, for example, an average particle/grain size ranging from about 10 to 60 microns. By "average particle or grain size" it is meant that the individual particles/grains have a range of sizes with the mean particle/grain size representing the "average". The average particle/grain size of the fine fraction is less than the size of the coarse fraction, for example between around 1/10 to 6/10 of the size of the coarse fraction, and may, in some examples, range for example between about 0.1 to 20 microns.

In some examples, the weight ratio of the coarse fraction to the fine fraction ranges from about 50% to about 97% coarse superhard grains and the weight ratio of the fine fraction may be from about 3% to about 50%. In other examples, the weight ratio of the coarse fraction to the fine fraction will range from about 70:30 to about 90:10.

In further examples, the weight ratio of the coarse fraction to the fine fraction may range for example from about 60:40 to about 80:20.

In some examples, the particle size distributions of the coarse and fine fractions do not overlap and in some examples the different size components of the compact are separated by an order of magnitude between the separate size fractions making up the multimodal distribution.

Some examples consist of a wide bi-modal size distribution between the coarse and fine fractions of superhard material, but some examples may include three or even four or more size modes which may, for example, be separated in size by an order of magnitude, for example, a blend of particle sizes whose average particle size is 20 microns, 2 microns, 200 nm and 20 nm.

Sizing of diamond particles/grains into fine fraction, coarse fraction, or other sizes in between, may be through known processes such as jet-milling of larger diamond grains and the like.

In some examples, the average grain size of the superhard grains in the second region 42 is greater (ie the material is coarser) than the average grain size of the superhard grains in the first region 40.

In examples where the super hard material is polycrystalline diamond material, the diamond grains used to form the polycrystalline diamond material may be natural or synthetic.

In some examples, the polycrystalline super hard material is PCBN and the superhard particles or grains comprise cBN.

In some examples, the binder catalyst/solvent used to assist in the bonding of the grains of superhard material such as diamond grains, may comprise cobalt or some other iron group elements, such as iron or nickel, or an alloy thereof. Carbides, nitrides, borides, and oxides of the metals of Groups IV-VI in the periodic table are other examples of non-diamond material that might be added to the sinter mix. In some examples, the binder/catalyst/sintering aid may be Co.

The cemented metal carbide substrate may be conventional in composition and, thus, may be include any of the Group IVB, VB, or VIB metals, which are pressed and sintered in the presence of a binder of cobalt, nickel or iron, or alloys thereof. In some examples, the metal carbide is tungsten carbide. The cutter of FIGS. 1 to 2k may be fabricated, for example, as follows.

As used herein, a "green body" is a body comprising grains to be sintered and a means of holding the grains together, such as a binder, for example an organic binder.

The substrate 10 is preferably pre-formed. In some examples, the substrate may be pre-formed by pressing the green body of grains of hard material such as tungsten carbide into the desired shape, including the interface features at one free end thereof, and sintering the green body to form the substrate element. In an alternative example, the substrate interface features may be machined from a sintered cylindrical body of hard material, to form the desired geometry for the interface features. The substrate may, for example, comprise WC particles bonded with a catalyst material such as cobalt, nickel, or iron, or mixtures thereof.

In some examples, the substrate may be cemented tungsten carbide. In some examples, the cemented carbide substrate may be formed of tungsten carbide particles bonded together by a binder material comprising Co or an alloy of Co, Ni and Cr. The tungsten carbide particles may form at least 70 weight percent and at most 95 weight percent of the substrate. The binder material may comprise between about 10 to 50 wt. % Ni, between about 0.1 to 10 wt. % Cr, and the remainder weight percent comprises Co.

To form the superhard first region 40, the superhard construction may be made by a method of preparing a green body comprising grains or particles of superhard material and a catalyst/binder material for promoting the sintering of the superhard grains. The green body may be made by combining the grains or particles with the binder/catalyst and forming them into a body having substantially the same general cylindrical shape as that of the overall intended sintered body of superhard material 12, and drying the binder. At least some of the binder material may be removed by, for example, burning it off. The green body may be formed by a method including a compaction process, an injection process or other methods such as molding, extrusion, deposition modelling methods.

The green body for the superhard construction for forming the first region 40 forms a pre-sinter assembly which may be encapsulated in a capsule for an ultra-high pressure furnace, as is known in the art. In particular, the superabrasive particles, for example in powder form, are placed inside a metal cup formed, for example, of niobium, tantalum, or titanium. The pre-composite is then outgassed at about 1050 degrees C. The pre-composite is closed by placing a second cup at the other end and the pre-composite is sealed by cold isostatic pressing or EB welding. The pre-composite is then sintered to form a sintered body of superhard material.

In one example, the method may include loading the capsule comprising the pre-sinter assembly into a press and subjecting the green body to an ultra-high pressure and a temperature at which the superhard material is thermodynamically stable to sinter the superhard grains. In some examples, the green body may comprise diamond grains and the pressure to which the assembly is subjected is at least about 5 GPa and the temperature is at least about 1,300 degrees centigrade. In some examples, the pressure to which the assembly may be subjected is around 5.5-6 GPa, but in some examples it may be around 7.7 GPa or greater. Also, in some examples, the temperature used in the sintering process may be in the range of around 1400 to around 1500 degrees C.

A version of the method may include making a diamond composite structure by means of a method disclosed, for example, in PCT application publication number WO2009/128034 with the additional step of admixing with the diamond grains, prior to sintering, catalyst material in the form of a metal binder such as 0 to 3 wt % cobalt. A powder blend comprising diamond particles and the metal binder material, such as cobalt may be prepared by combining these particles and blending them together. An effective powder preparation technology may be used to blend the powders, such as wet or dry multi-directional mixing, planetary ball milling and high shear mixing with a homogenizer. In one example, the mean size of the diamond particles for forming the first region 40 may be from about 1 to at least about 50 microns and they may be combined with other particles by mixing the powders or, in some cases, stirring the powders together by hand. In one version of the method, precursor materials suitable for subsequent conversion into binder material may be included in the powder blend, and in one version of the method, metal binder material may be introduced in a form suitable for infiltration into a green body. The powder blend may be deposited in a die or mold and compacted to form a green body, for example by uni-axial compaction or other compaction method, such as cold isostatic pressing (CIP). The green body may be subjected to a sintering process known in the art to form a sintered article. In one version, the method may include loading the capsule comprising a pre-sinter assembly into a press and subjecting the green body to an ultra-high pressure and a temperature at which the superhard material is thermodynamically stable to sinter the superhard grains.

After sintering, the polycrystalline super hard constructions may be ground to size and may include, if desired, a 45° chamfer of approximately 0.4 mm height on the body of polycrystalline super hard material so produced.

In the example of PCD, the sintered article may be subjected to a subsequent treatment at a pressure and temperature at which diamond is thermally stable to convert some or all of the non-diamond carbon back into diamond and produce a diamond composite structure. An ultra-high pressure furnace well known in the art of diamond synthesis may be used and the pressure may be at least about 5.5 GPa and the temperature may be at least about 1,250 degrees centigrade for the second sintering process.

Once the polycrystalline material has been sintered, in some examples, the body is cut using conventional techniques such as EDM machining or laser ablation to form the desired shape for the first region. The body of polycrystalline superhard material once shaped into the desired shape for the first region 40 is then rendered more thermally stable by, for example, subjecting the body to a conventional procedure such as acid leaching to remove residual binder/catalyst from the interstitial spaces between the inter-bonded grains of superhard material. In some examples, substantially all of the residual binder/catalyst is removed whilst in others only one or more regions of the first region 40 are depleted of residual binder/catalyst, depending on the intended application of the cutter element into which the first region 40 is to be incorporated.

A further pre-composite comprising the pre-formed substrate and first region 40 is prepared with the loose particles or grains of superhard material and any addition binder/catalyst to form the second region 42. A green body for the superhard construction, which comprises the pre-formed substrate, the superhard construction comprising the first region and the particles of superhard material to form the second region 42 such as diamond particles or cubic boron nitride particles, may be placed onto the substrate and around the first region 42, to form a pre-sinter assembly which may be encapsulated in a capsule for an ultra-high pressure furnace, as is known in the art. In particular, the superabrasive particles for forming the second region, for example in powder form, are placed inside a metal cup formed, for example, of niobium, tantalum, or titanium. The pre-formed substrate and first region are placed inside the cup and hydrostatically pressed into the superhard powder such that the requisite powder mass is pressed around the interface features of the preformed carbide substrate and first region to form the pre-composite. The pre-composite is then outgassed at about 1050 degrees C. The pre-composite is closed by placing a second cup at the other end and the pre-composite is sealed by cold isostatic pressing or EB welding.

The pre-composite is then sintered to form the sintered body of superhard material comprising the first and second regions bonded to the substrate along the interface therewith.

In one example, the method may include loading the capsule comprising the pre-sinter assembly into a press and subjecting the green body to an ultra-high pressure and a temperature at which the superhard material is thermodynamically stable to sinter the superhard grains. In some examples, the green body may comprise diamond grains and the pressure to which the assembly is subjected is at least about 5 GPa and the temperature is at least about 1,300 degrees centigrade. In some examples, the pressure to which the assembly may be subjected is around 5.5-6 GPa, but in some examples it may be around 7.7 GPa or greater. Also, in some examples, the temperature used in the sintering process may be in the range of around 1400 to around 1500 degrees C.

In an alternative version of the method, to form the super hard first region 40, a first pre-formed substrate is provided having a substrate body and a first end surface forming the interface, the first end surface of the substrate comprising a projection extending from the body of the substrate. An aggregated mass of diamond grains or grains of super hard material to form the super hard first region 40 is placed around the pre-formed substrate in the canister used for sintering and the construction is sintered under conventional sintering conditions to form a super hard first region attached to a first substrate. The sintered construction is removed from the canister and a chamfer applied to the peripheral edge of the free surface of the super hard first region, the chamfer being, for example, up to around 15 degrees from the free surface, for example around 12 degrees. The majority of the first substrate is removed from the construction and discarded. For example, a laser technique may be used to remove the first substrate from the super hard first region at around 0.5 mm below the interface between the substrate and the first region. The super hard first region and any residual substrate may then be treated, for example using a conventional acid leaching process to render the first region thermally stable and remove residual catalyst/binder and the remainder of the first substrate. The thermally stable first region may then be attached to a further pre-formed substrate in the manner described above in respect of the first described example. After attachment of the first thermally stable region to the further pre-formed substrate by sintering, the construction may be treated further to form the final desired outer dimensions, for example, the cutting surface may be planed to a level surface and outer peripheral surfaces finished to the desired dimensions and/or polished.

The sintered end product as shown for example in FIGS. 2a-2k, comprises at least three regions formed of the ring forming the first region 40 which is substantially non-re-infiltrated or only partially re-infiltrated with catalyst material during the second sintering stage, a sintered region of filling material infiltrated with a catalyst metal which forms the second region 42, and the substrate 10. Infiltration of catalyst material from the substrate 10 into the first region 40 during the second sintering stage may be minimised due to limited interface area between the first region 40 and the substrate 10, and/or due to the composition of the first region. For example interstitial pores in the first region may be filled with nano sized diamond or other ceramic particles, such as Alumina, Zirconia, and/or Yttria to inhibit further infiltration of catalyst material from the substrate into the first region 40. As the content of catalyst material in the first region which forms the periphery and therefore cutting edge of the cutter 1, no additional leaching of the cutter may be necessary after the second sintering stage.

In a further example, the second sintering process to attach the first thermally stable region 40 to the substrate 27, may cause catalyst/binder to infiltrate from the substrate 27 into an annular region in a portion of the first region 40 to form first region having one or more thermally stable annular regions separated by a less thermally stable region into which catalyst/binder has infiltrated, the less thermally stable region being spaced from the cutting surface 14 by a more thermally stable region.

Examples are described in more detail below with reference to the following example which is provided herein by way of illustration only and is not intended to be limiting.

Example 1

A mass of diamond powder is admixed with catalyst metal such as cobalt or mixtures of metal powders by wet ball milling in alcohol and drying at 80° C. The dried admixed powders may contain, for example, between around 15 to around 30% catalyst materials. The powder is placed in a niobium or titanium cup and pressed using a manual press or pill station to achieve a density that enables introducing enough powder for the required final weight for forming one or more unbacked PCD bodes to form the first region 40. The powders are degassed at a temperature ranging from between around 900° C. to around 1100° C. under a pressure of between around 10-5 mbar. The cup containing the degassed material is closed using another niobium cup and sealed by cold isostatic pressing in oil tank. Alternatively, EB welding may be used to seal niobium onto titanium cups. The sealed pre-composite is sintered in a High Pressure High Temperature system at a pressure of between around 5 GPa to around 8 GPa or greater at a temperature of between about 1300° C. to 2000° C. to form an intergrown PCD structure.

After sintering, the cup material is removed from the PCD structure by a conventional techniques such as sand blasting, grinding or leaching to recover the solid PCD structure. The solid piece of PCD material is cut into discs of required thickness using, for example, an EDM technique. To form the desired shape of the first region 40, a small hole is made through the disc by spark drilling/plasma techniques to form a passage for the EDM cutting wire. A portion of solid material is then removed from the disc to produce rings of desired inner geometries and diameters such as those shown in FIGS. 2 to 2k. The inner peripheral surfaces of the first region 40 may be non-circular and non-planar.

One or more annuli forming one or more first regions are then rendered more thermally stable by, for example, subjecting the rings to an acid leaching technique to remove residual binder/catalyst. For example, at least fifty percent by volume of the catalyst material may be removed, and the leached ring(s) washed in de-ionised water to remove catalyst salts adhered inside the interstitial pores of the PCD material.

The interstitial spaces in the leached PCD ring may be partially filled by infiltrating nano size particles of one or more of, for example, diamond, alumina, zirconia, yttria or similar ceramics using method such as filter vacuum, syringe, spraying or soaking in a boiling stabilised suspension of nano-sized particle slurry in water or alcohol.

The leached rings are then placed onto a pre-formed hard metal substrate inside a refractory metal cup such as a niobium or titanium cup. All or part of the volume between the ring forming the first region 40 and the hard metal substrate 10 are filled with a powder to form the second region 42 once sintered. The powder may comprise, for example, one or more different diamond grade materials, tungsten carbide, silicon carbide, or non-catalyst metal powders and/or their mixtures.

The pre-composites are dried and degassed and sealed as described above in respect of the formation of the first region 40. The sealed unit is then sintered in an HPHT system. The HPHT pressure and temperature for this second sintering cycle may not be the same as those used in the making of the first region, for example, in forming the first region the sintering pressure may be 5.5 GPa and sintering temperature may be 1400° C., whereas for the second sintering process to form the final cutter element, the sintering pressure may be, for example, 6.8 GPa and sintering temperature around 1500° C. In another example, the first sintering pressure was 7.1 GPa, and first sintering temperature around 1400° C. then the conditions of the second HPHT were changed to sinter at a pressure of 5.5 GPa and temperature of 1400° C.

The second sintering stage creates the second region 42 of polycrystalline superhard material and bonds this region to the first region and substrate to form the cutter element 1.

Example 2

Instead of forming the first region by sintering a substantially cylindrical block of polycrystalline superhard material that is subsequently shaped to the desired shape of the first region using laser ablation or EDM techniques, the first region may be formed as follows. Diamond powder is admixed with catalyst metal or mixtures of metal powders by wet ball milling in alcohol and drying at 80° C. In one example, the powder that was admixed contained a mixture of micron and sub-micron sized particles. The sub-micron particles were not in excess of 10 volume percent of the diamond mix. The dried admixed powders contained between around 15-30% catalyst material(s).

A green body with the desired geometry and dimensions for forming the first region 40 was prepared from the diamond powder mix. In one case the powder was pressed to form a green body around a pre-sintered tungsten carbide substrate coated with a fine zirconia layer to prevent bonding between the solid PCD and the substrate during first sintering. The use of pre-shaped solid carbide, zirconia or alumina helps to achieve controlled geometries of the pre-shaped green body during sintering. In another case the green body was formed by injection moulding or 3D printing having a circular or non-circular inner core composed of particles from non-bonding ceramics such as zirconia or alumina surrounded by an outer layer composed of diamond particles. These two parts may be manufactured separately then assembled into one green body.

The assembly of diamond green body and the pre-shaped core substrate was placed in a niobium or titanium cup. In another example, a diamond powder mix was introduced in the metal cup and pressed around the pre-shaped substrate using a manual press or pill station to achieve a density that enables the introduction of enough powder for the required final weight for the formation of the desired first region.

The binder materials used in forming the green body was removed by heating up to 700° C. in a controlled atmosphere to form a pre-composite. The pre-composite was then degassed at a temperature ranging from between around 900° C. and around 1100° C. under a pressure of 10-5 mbar.

The cup containing the degassed material was closed using another niobium cup and sealed by cold isostatic pressing in an oil tank. Alternatively, EB welding may be used to seal niobium onto a titanium cup. The sealed pre-composite was sintered in a High Pressure High Temperature system at a pressure of between around 5 GPa to around 8 GPa at a temperature of between around 1300° C. to around 2000° C. to form an intergrown PCD structure.

After sintering the cup material was removed by sand blasting, grinding or leaching to recover the solid PCD product that was to form a first region of the cutter element. The substrate at the core of the sintered product was removed by mechanical means (such as drilling) or chemical leaching.

The solid piece of PCD was then cut into discs of required thickness using EDM machining. The pre-shaped ring(s) to form one or more first regions were leached in an acid mixture to remove at least fifty percent by volume of the residual binder/catalyst material from interstitial spaces in the PCD material.

A leached ring was then placed onto a further hard metal substrate inside a refractory metal cup such as a niobium or titanium cup. All or part of the volume between the ring and the hard metal substrate was filled with powder to form the second region in the cutter element. The sintered [product was then created using the same procedure as described above in Example 1.

The PCD cutter was recovered, processed and analysed. The results are discussed below with reference to FIG. 4.

Various sample of PCD material were prepared and analysed by subjecting the samples to a number of tests. The results of these tests are shown in FIG. 4.

The PCD compact formed according to Example 1 was compared in a vertical boring mill test with two leached conventional polycrystalline diamond cutter elements formed of diamond grains having an average grain size of 12 microns and which were sintered under pressures of around 5.5 GPa. In this test, the wear flat area was measured as a function of the number of passes of the cutter element boring into the workpiece. The results obtained are illustrated graphically in FIG. 4. The results provide an indication of the total wear scar area plotted against cutting length. It will be seen that the PCD compact formed according to Example 1 denoted by the reference numeral 74 was able to achieve a greater cutting length and smaller wear scar area than that occurring in both of the conventionally leached PCD compacts (denoted by reference numerals 70 and 72) which were subjected to the same test for comparison.

Whilst not wishing to be bound by a particular theory, it is believed that crack propagation may be controlled by introducing a material such as that formed by the second region in combination with the protruding part of the substrate which may act to slow down the propagation rate of a crack before the critical length of the crack is reached and hence avoid spalling of the non-working area of the superhard material. The protruding part of the substrate has a higher impact resistance compared to the superabrasive first region, as has the second region in some examples, and thereby act(s) to arrest the cracks to avoid spalling or catastrophic failure during use of the cutter element.

The size and shape of the substrate features may be tailored to the final application of the superhard material. It is believed possible to improve spalling resistance without significantly compromising the overall abrasion resistance of the material, which is desirable for PCD and PCBN cutting tools.

The vertical borer test results of these engineered structures show a considerable increase in PCD cutting tool life compared to conventional PCD, and with no degradation in abrasion resistance.

Observation of the wear scar development during testing showed the material's ability to generate large wear scars without exhibiting brittle-type micro-fractures (e.g. spalling or chipping), leading to a longer tool life.

Thus, examples of, for example, a PCD material, may be formed having a combination of high abrasion and fracture performance.

The PCD element 10 described with reference to FIGS. 2*a* to 2*k* may not need to be further processed after sintering. For example, there may be no need to subject the element 1 to additional leaching procedures to leach out residual catalyst material from between the diamond grains, as the first region which may form the majority of the superhard body 12 is already more thermally stable than when first sintered.

The PCD body in the structure of FIGS. 1 to 2k comprising a PCD structure bonded to a cemented carbide support body may be further finished by, for example, grinding, to provide a PCD element which is substantially cylindrical and having a substantially planar working surface, or a generally domed, pointed, rounded conical or frusto-conical working surface. The PCD element may be suitable for use in, for example, a rotary shear (or drag) bit for boring into the earth, for a percussion drill bit or for a pick for mining or asphalt degradation.

While various examples have been described with reference to a number of examples, those skilled in the art will understand that various changes may be made and equivalents may be substituted for elements thereof and that these examples are not intended to limit the particular examples disclosed.

The invention claimed is:

1. A method of forming a superhard polycrystalline construction, comprising:
    providing a first mass of particles or grains of superhard material;
    admixing the first mass of particles or grains with a binder material to form a first green body;
    placing the first green body into a canister to form a first pre-sinter assembly;
    treating the first pre-sinter assembly in the presence of a catalyst/solvent material for the superhard grains at an ultra-high pressure of around 5.5 GPa or greater and a temperature to sinter together the grains of superhard material to form a first polycrystalline superhard construction;
    processing the first polycrystalline superhard construction to form a first thermally stable annular region;
    preparing a second pre-sinter assembly comprising placing a second mass of particles or grains of superhard material to form a second polycrystalline superhard region in contact with a pre-formed substrate and the first thermally stable annular region, the pre-formed substrate having a longitudinal axis and comprising a body portion and a projection, the projection extending at least in part from the body portion by around 3 mm or greater as measured in a plane parallel to the longitudinal axis of the substrate;
    treating the second pre-sinter assembly in the presence of a catalyst/solvent material for the superhard grains at an ultra-high pressure of around 5.5 GPa or greater and a temperature to sinter together the second mass of grains of superhard material to form the second region and bond the substrate to the first and second regions of polycrystalline superhard material; wherein the projection extends from the body of the substrate into the body of superhard material towards a cutting face, the body of polycrystalline material extending around the projection; and wherein the body of polycrystalline material has a thickness from the cutting face along a peripheral side edge of the construction to the interface with the substrate of at least around 3 mm, the cutting face being in the first region.

2. The method of claim 1, wherein the step of placing the first green body into a canister to form a first pre-sinter assembly further comprises pressing the superhard particles or grains around a pre-sintered shaped substrate coated with a layer to prevent bonding between the superhard particles and the substrate during the first sintering stage, the substrate being shaped to impart the annular shape to the superhard particles of grains once sintered; and
    wherein the step of processing the first polycrystalline superhard construction to form a first annular region comprises removing the shaped substrate after sintering.

3. The method of claim 2, wherein the shaped substrate is coated with one or more of zirconia or alumina.

4. The method of claim 1, wherein the first polycrystalline super hard construction comprises a first substrate having a substrate body and a projection extending from the body of the first substrate into the body of super hard material, the body of polycrystalline material extending around the projection and being bonded to the first substrate along an interface; and wherein the body of polycrystalline material has a thickness from the cutting face along a peripheral side edge of the construction to the interface with the first substrate of at least around 3 mm; and
    wherein the step of processing the first polycrystalline super hard construction to form the first thermally stable annular region comprises:
    removing at least a part of the first substrate from the first polycrystalline construction;
    treating the first polycrystalline construction to remove residual catalyst/binder from the majority of interstitial spaces in the first polycrystalline construction and the residual first substrate.

5. The method of claim 1, further comprising placing a protective layer over at least a portion of the cutting face.

6. The method of claim 5, wherein the step of placing the protective layer on at least a portion of the cutting face comprises attaching or spraying a layer of resistant polymer, oxide, paint, or composite material to said face.

7. The method of claim 5, wherein the step of placing the protective layer on at least a portion of the cutting face comprises forming said layer prior to sintering and placing said layer in contact with the pre-sinter assembly to bond the layer to the body of superhard material during the step of sintering.

8. The method of claim 1, wherein the step of processing the first polycrystalline superhard construction to form a first thermally stable annular region comprises subjecting the first region to a process to remove at least a portion of residual binder/catalyst from interstitial spaces between the interbonded grains of superhard material forming the first region.

9. The method of claim 1, wherein the step of providing a first mass of particles or grains of superhard material comprises providing a mass of natural and/or synthetic diamond grains or particles, and/or cubic boron nitride grains or particles.

* * * * *